United States Patent Office 3,274,419
Patented Sept. 20, 1966

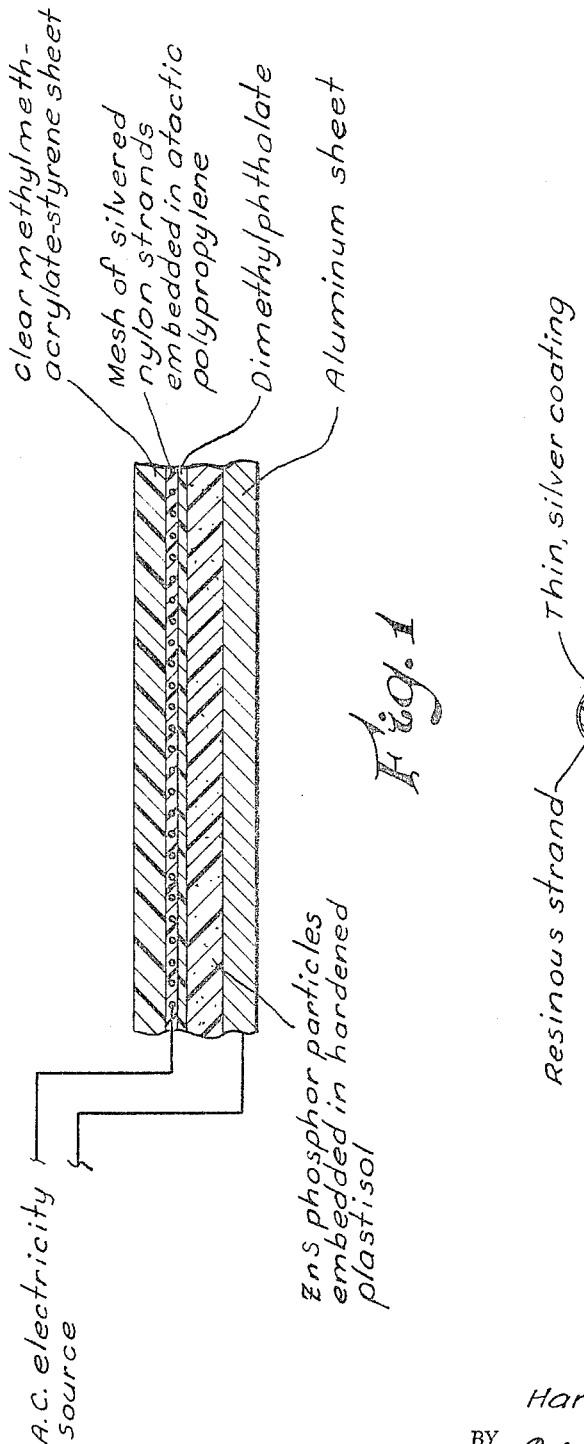

3,274,419
FLEXIBLE ELECTROLUMINESCENT LAMP HAVING TRANSPARENT METAL-COATED STRANDS AS THE LIGHT TRANSMITTING ELECTRODE
Harold H. Roth, Bay City, Mich., assignor to The Dow Chemical Company, Midland, Mich., a corporation of Delaware
Filed Jan. 23, 1962, Ser. No. 168,221
8 Claims. (Cl. 313—108)

The invention is an improved electroluminescent lamp.

The phenomenon of electroluminescence manifests itself by the glow of a selected compound, called a phosphor (usually ZnS activated by the presence of one or more elements which are usually selected from Mn, Cu and/or Se, together with Cl) substantially uniformly dispersed in a dielectric matrix, when placed in an oscillating electric field.

This phenomenon has been utilized to construct electroluminescent structures comprising a solidified intimate mixture of a dispersed phosphor in a dielectric matrix having an electrically conducting metal base adhered to one face thereof and a light-transmitting conducting film adhered to the other face, each of said base and film being provided with terminals for electrical connection to a source of oscillating current. When the terminals are connected to a source of oscillating electrical current, they provide a subdued or low-level light unusually well adapted for use in darkened isles, hallways, tunnels, subways, instrument boards, and the like.

The term, phosphor plate, will be used herein in the specific sense of an intimate layer of a phosphor and a dielectric material having adhered to one face thereof a conducting metal base provided with an electrical terminal. The term, electroluminescent panel, will be used herein to designate such plate having a conducting transparent film adhered to the opposing face of the phosphor-dielectric layer and provided with an electrical terminal. The term, transparent, is used herein to indicate detectable light transmission.

When unprotected, a phosphor-dielectric layer is subject to deterioration while in use, due to the effects of atmosphere, particularly moist air. For practical purposes, therefore, it is necessary to provide the panel with one or more transparent protective films ensheathing the plate or, at least adhering to the light-emitting side thereof. A panel, thus provided with an outer protective coating or film ready for use will be referred to hereinafter as an electroluminescent lamp.

A large number of such lamps, of convenient size adapted for each installation in circuits, are commonly employed commercially and domestically, e.g., for use in 110 or 220 volt, 50 or 60 cycle, alternating current. Others are adapted for use in instrument boards such as are employed in ships, automobiles, and aeroplanes, often operating on an oscillating current converted from a D.C. source.

The metal base of a phosphor plate is conveniently of a metal, e.g., an iron, aluminum, or magnesium alloy.

The transparent electrically conductive layer adhered to the phosphor plate of a conventional electroluminescent lamp is usually a continuous film of an inorganic salt or oxide, e.g., one of tin, cadmium or indium.

The phosphor-dielectric layer is conventionally of activated ZnS dispersed in a glass or ceramic frit. The resulting conventional panel is relatively rigid. A number of dielectric-organic plastic materials might be advantageously employed in place of ceramic or glass to lend flexibility to the phosphor plate but their use appears to have been handicapped by the fact that, for good results, the conductive transparent film, e.g., $SnO_2$, must be deposited on the glass while the latter is at a temperature of at least about 400° C. and for best results at a temperature of about 600° C. or higher. Plastic or organic resins usually may not be subjected to temperatures in this elevated range without damage thereto. Attempts to overcome this disadvantage include: coating glass fibers with a suitable metallic salt and making a mat thereof or alternately making a glass fiber mat and then impregnating the mat with a solution of such salt and employing the mat prepared according to such procedure as the transparent conductive coating of the type described in U.S. Patent 2,774,004, or employing an opaque conducting metal such as silver strands in the form of a grid which permits light to pass through the interstices thereof (in lieu of applying a transparent coating thereon) as in U.S. Patent 2,765,419. Some known transparent conductive films do not lend themselves readily to the application of protective films thereover. This, of course, is a serious defect since for all practical purposes, a moisture-resistant barrier film should be adhered exterior to the electrically conducting transparent film at least to the face and edges thereof, and preferably to the back as well, thereby to ensheath the entire panel.

Certain disadvantages are attendant on the use of a transparent electrically conductive metal salt or oxide film. One such disadvantage is absorption of light which results in the transmissibility of light through such films being less than is desired. There are also disadvantages attendant upon the use of either a glass mat or a grid of solid metal strands to provide the conductive layer on the light transmitting side of the panel, e.g., glass mats are lacking in strength properties when subjected to stress and do not permit packaging of such paneling material in rolls, a particularly desirable mode of packaging. Initial tack or adherence of the conducting material to the glass fibers is low unless the procedure is carried out at highly elevated temperatures. Furthermore, such adhesion, although initially satisfactory, often decreases with time and, under certain stresses encountered in transportation, storage, and installation, allows some separation. When grids of apaque metal are employed, the percent of transmitted light in proportion to the light initiated by the phosphor is undesirably low. As aforesaid, a particular disadvantage resides in existent panels which require a rigid ceramic matrix for the phosphor, which defect could be largely remedied by employment of a dielectric plastic except that such plastic does not withstand the high temperature required to deposit the transparent conductive film thereon.

There is, accordingly, a need for electroluminescent panels which possess specific strength properties to be fully satisfactory for a number of uses wherein known panels have not heretofore been acceptable. There is also a need for such panels which transmit a high percentage of the light initiated in the phosphor panel. There is a need, too, for electroluminescent panels which are highly flexible and may be placed in rolls for shipment and storage and used on circular support columns and irregularly contoured surfaces without suffering damage or impaired service. This need is closely associated with a type of transparent conductive film which permits the use of a flexible plastic dielectric matrix for the phosphor. There is also a need for such panels that lend themselves readily to encapsulation by moisture-protective external films.

It is the principal object of the invention to meet these and related needs. The manner and means of attaining this, and objects associated therewith, are made clear in the ensuing description and are defined in the appended claims.

The invention, therefore, is an electroluminescent panel adapted to encapsulation by a moisture protective film to produce a lamp which is highly flexible and permits a high percentage of light initiated therein to be emitted therefrom and which retains all other desirable properties now associated with the better electroluminescent lamps now known.

The invention is practiced broadly by metallizing, i.e., depositing an adherent coating of metal, on synthetic or natural organic resinous strands or fibers which may be prewoven and are preferably transparent, to form a coating thereon, and adhering the thus coated strands or fibers to a phosphor-dielectric layer of a phosphor plate consisting essentially of a flexible layer of a phosphor and dielectric mixture adhered to a flexible metal base. The dielectric material employed is a transparent flexible resin which permits rolling or bending of the finished lamp without impairment of its performance.

The invention is usually practiced by first water-washing and drying the resinous strands (to be used to provide the electrically conducting transparent film), sensitizing or activating the dried strands (as hereinafter explained), immersing the treated strands in an aqueous acidic solution of a conductive adherent transparent material, e.g., $SnO_2$, and rinsing again with water. The strands so prepared are then metallized, usually silvered, as by immersing them in an aqueous solution of ammoniacal silver nitrate containing some formaldehyde.

If preferred, a fabric, e.g., a 10 to 200 denier woven nylon fabric, of which that commonly employed in the manufacture of hosiery is illustrative, may be metallized and adhered to the phosphor-dielectric layer instead of the individual strands of resinous material. The individual strands or fabric may be adhered directly to the phosphor-dielectric layer which had previously been cast on a flexible metal base, e.g., aluminum foil. However, it is sometimes advantageous to make a mat by placing the strands or fabric on a thin sheet of resin, e.g., Zerlon, or preferably Zerlon upon which a thin film of a thermoplastic resinous pressure-sensitive adhesive material, which forms especially strong bonds between the strands or fabric, is applied. (Zerlon is a polymer made by copolymerizing a major proportion of methylmethacrylate and a minor proportion of styrene.) A suitable thermoplastic material for such use is atactic polypropylene. The thus formed mat is then placed on the phosphor-dielectric layer with the metallized strands in contact therewith and the sheet of resinous base thereof exposed.

The resinous strands to be metallized are, as aforesaid, subjected, preparatory to the metallizing thereof, to an activating treatment which consists essentially of subjecting the surface, of the strands to the effect of one of: electric sparks, a flame, or the application of selected chemicals. The spark treatment, known as "Sparking," is of the nature of that produced by an induction coil moved about the surface of the strands or fabric so as to contact the surface with an electric spark produced by a high voltage. A convenient device to employ to "spark" the surface is a Fisher Scientific High Frequency Vacuum Tester known as a Tesla Coil. Flame treatment may be attained conveniently by use of a gas flame "played" on the surface of the resin. Illustrative of chemicals to employ are gaseous chlorine or concentrated sulfuric acid.

The strands may be of any, of the known transparent synthetic resins, which has a satisfactory physical strength, among which are polyamide, polyesters, polyacrylonitrile, polyacrylate, polymethylmethacrylate, polyvinyl chloride, polyfluoroethylene, polymonochlotrifluoroethylene, and transparent copolymers, e.g., one of a major proportion of styrene and a minor proportion of methylmethacrylate, or they may be of natural fibers, e.g., silk, cotton, wool, hemp, linen, or sisal. Commercially available suitable synthetic resins falling under the broad classes of polymers named above, which are suitable to employ are nylon, Plaskon, Lustrex, P.E. or Poly-Eth., Poly-Pro or Propathene, Lucite, Creslan, Zerlon, Zefran, saran, Teflon, Dacron, Mylar, Kel-F, and Tyril. The nature and place of procurement of these and other suitable resins may be found in any recent Modern Plastics Encyclopedia, e.g., on the "Plastics Properties Chart" (a detachable table) and/or under "Directory of Trade Designations of Plastic Materials and Processes," e.g., pages 1302 and 1322 of vol. 38, the 1960 edition.

The diameter of the strands employed is not highly critical, strands of between about 0.0005 and 0.01 inch, preferably not over 0.005 inch usually being employed. Similarly, the spacing of the strands is not highly critical, a spacing between about 0.002 and 0.010 inch usually being provided. Close examination of light produced by a single silvered Zerlon strand of the type used in the practice of the invention when placed in a 250 volt, 500 cycle A.C., showed the light throw along the light path, that is, the gap over which the electricity could be made to pass between strands, to be 0.007 inch. This was about 10 times the diameter of the silvered strands being used. At increased voltages, the light throw increased. The lamp of the invention, as aforesaid, lends itself readily to the use of exterior protective films.

The annexed drawing illustrates the electroluminescent lamp of the invention.

In the drawing:

FIGURE 1 shows a cross-section of a lamp made according to Example 1, infra, wherein zinc sulfide particles dispersed in a plastisol (polyvinylchloride) frit has one face thereof adhered to a solid aluminum sheet and the other face thereof (by means of dimethylphthalate) adhered to a conductive transparent mesh composed of interwoven nylon strands (which had previously been individually coated with silver metal by immersion into an ammoniacal aqueous solution of silver nitrate containing formaldehyde as a reducing agent) embedded in atactic polypropylene, and the assembly so made protected by an adherent layer of methylmethacrylatestyrene polymer. Electric lines are shown leading from the aluminum sheet and from the nylon mesh to a source of electricity.

FIGURE 2 shows a cross-section of a resinous strand employed in the mesh of Example 1 wherein the strand is magnified for better illustrating the nature of the strand having a thin coating of silver metal thereon, e.g., one of say 50 to 100 Angstrom units in thickness. The drawing illustrates one embodiment of the invention and, accordingly, the scope of the invention is not to be limited thereto. For example, copper metal may be chemically deposited on the strands instead of silver and organic phosphors, e.g., anthracene particles, may be used instead of zinc sulfide.

The following examples are illustrative of the invention.

*Example 1*

A 0.005 inch thick 1½" x 3" aluminum foil was roughened with a piece of No. 0 emery paper. A paste, consisting by weight of 62.5% ZnS (of a particle size such that it all passed through a No. 440 mesh screen), 37.5% of a plastisol consisting of 30% polyvinyl chloride in 70% tri-m-tolyl phosphate thus providing 11.25% polyvinyl chloride based on the phosphor-dielectric mixture was prepared. The mixture was then cast on the aluminum foil to a thickness of 0.002 inch. The thus cast coating was hardened at 150° C. for 4 minutes. A piece of silvered nylon fabric was prepared by "sparking" and silvering a piece of nylon, of the guage commonly employed in hosiery, and adhering the fabric so treated to a Zerlon sheet (having a film of atactic polypropylene previously applied to the contacting side thereof for improved bonding) to make a mat. The phosphor-polyvinyl chloride layer was then wetted with about 3 drops of dimethyl phthalate and the silvered nylon fabric adhered thereto so that the strands contacted the phosphor-dielectric and the Zerlon was exposed on the out-side. There was thus provided an electrically conducting transparent mat, according to the invention, over the 0.002 inch layer of phosphor and plastic polyvinyl chloride intimate mixture. The lamp thus made was exceedingly flexible. It was placed in a 110 volt, 60 cycle A.C. circuit and the resistance and visual threshold light voltage ascertained. It was found to have a resistance of 163,000 ohms and a visual threshold light voltage of 9 volts. By visual threshold light voltage is meant that voltage, at 60 cycles, A.C., which produces light just visible to the naked eye in a Dumont dark viewing hood. The transparency of the mat was independently determined on a Lange colorimeter and found to be 71%.

*Example 2*

The procedure of Example 1 was followed except that the resinous strands employed was polyacrylonitrile instead of nylon and the back plate was of thin stainless steel instead of aluminum foil. The mat was prepared by pressing the silvered polyacrylonitrile strands onto a coating of atactic polypropylene on a 1⅝" x 4", 0.011" thick piece, of Zerlon, substantially as in Example 1. The electrical resistance across the surface of the mat of polyacrylonitrile fibers was measured and found to be between 600 and 3,000 ohms per inch. The transparency of the mat was independently measured on a Lange Colorimeter and found to be 73%. The Zerlon film, with the silvered polyacrylonitrile strands adhered thereto (having the Zerlon film outward), was then pressed onto the exposed surface of the ZNS-polyvinyl chloride intimate mixture of the phosphor plate to make a panel in accordance with the invention. The electroluminescent panel so made was placed in a 250 volt, 60 cycle A.C. circuit and produced a satisfactory light of good intensity.

*Example 3*

The following example was run to show the effectiveness of tri-n-butyl phosphate as the wetting agent for use in securing the metallized fabric to the phosphor-dielectric layer based upon brightness of the strand in an electric field as measured by a photocell.

A 2" x 6", 0.005" thick, piece of oxidized aluminum foil was coated first with 0.001 inch of a barium titanate-cyanoethylated cellulose intimate mixture. Over this was then coated 0.001 inch of a Radelin 3663 phosphor-cyanoethylated cellulose intimate mixture. (Radelin 3663 is a green colored ZnS phosphor available from the U.S. Radium Corporation.) Over a part of the phosphor-dielectric resin surface thus provided was spread a small amount of tri-n-butyl phosphate thickened with Cab-O-Sil (a colloidal silica of Godfrey L. Cabot). A 0.005 inch metallized strand was placed in the thickened tri-n-butyl phosphate and pressed intimately into the phosphor-dielectric resin surface by clamping a plastic polyvinyl chloride film to the strand. At 110 volts, 60 cycles, A.C., a bright light path of 0.125 inch was measured, with light dimly extending to a fringe width of 0.5 inch. It was, accordingly, estimated that the light throw was quite satisfactory for placing the strands up to 0.4 inch apart.

*Example 4*

The procedure of Example 3 was followed except that dimethyl phthalate was used in place of the tri-n-butyl phosphate. A light path of 0.031 inch was measured to the fringe.

To show the "light throw" and indirectly the extent to which the electric current will move from strand to strand in the mat of the invention, the following example was run.

*Example 5*

To the phosphor plate described in Example 3 was attached a silvered nylon fabric (0.062 inch spacing) imbedded in a plastic polyvinyl chloride, after wetting the surface of the phosphor plate with tri-n-butyl phosphate. At 110 volt, 60 cycles, A.C., brightness of the lamp was measured as 27 millivolts voltage drop across a 1000,000 ohm shunt connected across the output leads of an international Rectifier Corporation DP3 photocell placed directly over the face of the lamp.

Reference to the examples show that a novel, highly efficient electroluminescent panel is made following the procedure of which the examples are illustrative.

The panel lends itself readily to known techniques of providing moisture-protective films thereover. Such films may be provided only on the light-emitting side and a tight seal at the edge of the panel is insured, or preferably they may be provided in such manner as to encapsulate the entire panel. A convenient procedure to follow to encapsulate a panel of the invention is to place the metal base of the assembled panel on a transparent film of low moisture penetrability, e.g., a homopolymer such as polyethylene, polypropylene, polystyrene, polymethylmethacrylate or a copolymer such as an olefin copolymerized with acrylic acid or methacrylic acid, or materials of low moisture penetrability as glass. A second moisture protective film is then laid on the transparent top conductive mat of silvered strands and the assembly so made placed in a heated press, a pressure of about 100 p.s.i. and a temperature between about 100 and 180° C. produces excellent encapsulation. If desired, an outer transparent film, which screens out a substantial portion of ultra-violet light, may be adhered to the moisture-protective film adhered to the panel of the invention. A particularly suitable material to employ as this outer film is a polyester, e.g., Mylar.

Having described my invention, what I claim and desire to protect by Letters Patent is:

1. A flexible electroluminescent lamp of improved efficiency consisting of a layer comprising a flexible solidified intimate intermixture of a phosphor and a resinous dielectric material, said layer provided with flexible electrical conducting sheets adhered to the opposing faces thereof, at least one of said sheets being a light-transmitting mat composed of transparent metal-coated, spaced-apart strands selected from the class consisting of synthetic and natural fibers.

2. The electroluminescent lamp of claim 1 ensheathed by an envelope of a resinous film which is highly impervious to penetration by moisture.

3. The electroluminescent lamp of claim 1 wherein said strands are composed of a polymer of acrylonitrile having an average diameter of between about 0.0005 and 0.01 inch and spaced apart a distance of between about 0.002 and 0.4 inch.

4. The electroluminescent lamp of claim 1 wherein said strands are nylon and the metal coating of such strands is metallic silver deposited from an ammoniacal silver salt solution.

5. The method of providing a transparent electrically conductive film on a solid layer of a mixture of a phosphor and a dielectric resin adhered to a metal base for use as an electroluminescent lamp consisting of the steps of: depositing a substantially uniform coating of a conductive metal on organic resinous strands having a diameter of between 0.0005 and 0.01 inch forming such strands into a substantially parallel arrangement between about 0.002 and 0.4 inch apart to form a transparent electrically conductive mat, and positioning and adhering the mat so formed on the exposed face of a said phosphor-dielectric sheet.

6. The method of claim 5 wherein said metallized resinous strands are positioned on a thermoplastic film of suitable softening temperature adhered to a stable resin sheet to make a fabric thereof and adhering the thus formed fabric to said phosphor-dielectric layer with the metallized strands in contact with said layer.

7. The method of claim 5 wherein adhesion of said strands is enhanced by treating the face thereof to be contacted with said phosphor-dielectric sheet with a small but effective amount of an electrically conducting organic liquid.

8. The method of claim 7 wherein said electrically conducting organic liquid is selected from the class consisting of dimethyl phthalate, tri-meta-tolyl phosphate, and tri-n-butyl phosphate.

References Cited by the Examiner

UNITED STATES PATENTS

| | | | |
|---|---|---|---|
| 2,602,757 | 7/1952 | Kantrowitz et al. | 117—138.8 |
| 2,765,419 | 10/1956 | Roberts | 313—108 |
| 2,774,004 | 12/1956 | Jaffee | 313—108.1 |
| 2,809,316 | 10/1957 | Jeges | 313—108.1 |
| 2,849,339 | 8/1958 | Jaffe | 313—108.1 |
| 2,918,594 | 12/1959 | Fridrich | 313—108 |
| 2,920,256 | 1/1960 | Lewis | 313—108.1 |
| 2,976,446 | 3/1961 | Meloon et al. | 313—108.1 |
| 2,986,480 | 5/1961 | Reiss | 117—138.8 |
| 3,037,137 | 5/1962 | Motson | 313—108.1 |
| 3,110,836 | 11/1963 | Blazek et al. | 313—108 |

JAMES W. LAWRENCE, *Primary Examiner.*

GEORGE N. WESTBY, *Examiner.*

R. SEGAL, C. R. CAMPBELL, R. JUDD,
*Assistant Examiners.*